United States Patent
Hirotomi et al.

(10) Patent No.: US 9,551,389 B2
(45) Date of Patent: Jan. 24, 2017

(54) BICYCLE DISC BRAKE CALIPER

(71) Applicant: Shimano Inc., Sakai, Osaka (JP)

(72) Inventors: Shinya Hirotomi, Osaka (JP); Osamu Kariyama, Osaka (JP); Takahiro Yamashita, Osaka (JP); Masahito Nakakura, Osaka (JP); Tetsu Nonoshita, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/600,929

(22) Filed: Jan. 20, 2015

(65) Prior Publication Data

US 2015/0129373 A1 May 14, 2015

Related U.S. Application Data

(62) Division of application No. 13/217,331, filed on Aug. 25, 2011, now abandoned.

(51) Int. Cl.
*F16D 55/22* (2006.01)
*F16D 65/00* (2006.01)
(Continued)

(52) U.S. Cl.
CPC .......... *F16D 65/0075* (2013.01); *B60T 7/102* (2013.01); *B60T 11/046* (2013.01); *B62L 3/00* (2013.01);
(Continued)

(58) Field of Classification Search
CPC ................. F16D 2055/002; F16D 2055/0091; F16D 2055/0016; F16D 55/227; F16D 55/228; F16D 65/0075; F16D 65/0068; B62L 3/023
See application file for complete search history.

(56) References Cited

U.S. PATENT DOCUMENTS 3,170,543 A * 2/1965 Cook .................... F16D 55/228
188/351
3,396,824 A * 8/1968 Meier .................... F16D 55/228
188/382
(Continued)

FOREIGN PATENT DOCUMENTS

DE WO 9727094 A1 * 7/1997 ............... B23B 1/00
EP 1 744 948 B1 6/2008
(Continued)

OTHER PUBLICATIONS

Shimano Inc.; DEORE XT Rear Disk Brake, BR-M776 Brake Caliper SM-BH63 Brake Hose SM-RT78 Disc Rotor; 2010, Osaka, Japan.

*Primary Examiner* — Bradley King
*Assistant Examiner* — Stephen Bowes
(74) *Attorney, Agent, or Firm* — Global IP Counselors

(57) ABSTRACT

A bicycle disc brake caliper is basically provided with a first side caliper part, a second side caliper part, a layer of bonding material, a mating recess and a mating protrusion. The first side caliper part includes a first bonding surface. The second side caliper part includes a second bonding surface. The layer of bonding material is disposed between the first and second bonding surfaces of the first and second side caliper parts. The mating recess is disposed on one of the first and second side caliper parts. The mating protrusion is disposed on the other of the first and second side caliper parts and mated with the mating recess. The first and second bonding surfaces of the first and second side caliper parts are fixedly bonded together by the layer of bonding material with a brake disc slot being defined between the first and second side caliper parts.

12 Claims, 14 Drawing Sheets

(51) Int. Cl.
*B60T 7/10* (2006.01)
*B60T 11/04* (2006.01)
*B62L 3/02* (2006.01)
*F16D 55/228* (2006.01)
*F16D 65/18* (2006.01)
*B62L 3/00* (2006.01)
*F16D 55/00* (2006.01)
*F16D 121/04* (2012.01)

(52) U.S. Cl.
CPC ............ B62L 3/023 (2013.01); F16D 55/228 (2013.01); F16D 65/18 (2013.01); F16D 2055/0008 (2013.01); F16D 2121/04 (2013.01)

(56) References Cited

U.S. PATENT DOCUMENTS

| | | | | |
|---|---|---|---|---|
| 3,435,922 A * | 4/1969 | Schmid | ................... | F16D 55/22 188/106 F |
| 3,675,743 A * | 7/1972 | Thompson | ............ | F16D 55/228 188/370 |
| 3,730,306 A * | 5/1973 | Rath | ..................... | F16D 55/22 188/345 |
| 4,191,677 A * | 3/1980 | Strand | ................... | C09J 163/00 411/903 |
| 4,535,873 A * | 8/1985 | Airheart | ................ | F16D 55/228 188/72.4 |
| 4,754,856 A | 7/1988 | Villata | | |
| 5,622,242 A | 4/1997 | Handke et al. | | |
| 5,692,764 A * | 12/1997 | Klein | ..................... | B62K 21/02 188/DIG. 1 |
| 5,950,772 A | 9/1999 | Buckley et al. | | |
| 6,241,055 B1 | 6/2001 | Daudi | | |
| 6,250,439 B1 * | 6/2001 | Matsuzaki | ............... | F16D 55/22 188/73.31 |
| 6,298,954 B1 | 10/2001 | Weiler et al. | | |
| 6,321,880 B2 * | 11/2001 | Nakamura | ................. | 188/24.11 |
| 6,435,318 B1 | 8/2002 | Chen | | |
| 6,491,137 B2 | 12/2002 | Lumpkin et al. | | |
| 6,557,671 B1 | 5/2003 | Kirimoto et al. | | |
| 6,935,468 B2 | 8/2005 | Regazzoni et al. | | |
| 6,986,637 B2 | 1/2006 | Coxhead | | |
| 7,318,502 B2 | 1/2008 | Costa | | |
| 7,384,093 B2 | 6/2008 | Rasmussen | | |
| 7,438,366 B2 | 10/2008 | Machamer et al. | | |
| 7,997,389 B2 | 8/2011 | Chen | | |
| 2003/0173160 A1 * | 9/2003 | Matsushita | ............. | B62L 3/023 188/2 D |
| 2005/0183909 A1 | 8/2005 | Rau, III et al. | | |
| 2005/0251986 A1 | 11/2005 | Katayama et al. | | |
| 2011/0000748 A1 | 1/2011 | Yamashita et al. | | |
| 2011/0000749 A1 | 1/2011 | Yamashita et al. | | |

FOREIGN PATENT DOCUMENTS

| | | | | |
|---|---|---|---|---|
| GB | 982983 A * | 2/1965 | .......... | F16D 55/228 |
| JP | 58-57527 A | 4/1983 | | |
| JP | 63149436 A * | 6/1988 | | |
| TW | 412490 B | 11/2000 | | |
| TW | 559183 U | 10/2003 | | |
| TW | 200934690 A | 8/2009 | | |

* cited by examiner

BICYCLE DISC BRAKE CALIPER

CROSS-REFERENCE TO RELATED APPLICATIONS

This application is a divisional application of U.S. patent application Ser. No. 13/217,331 filed on Aug. 25, 2011. The entire disclosure of U.S. patent application Ser. No. 13/217,331 is hereby incorporated herein by reference.

BACKGROUND

Field of the Invention

This invention generally relates to a bicycle disc brake caliper. More specifically, the present invention relates to a bicycle disc brake caliper that has two with caliper parts or housings that are fixed together.

Background Information

In recent years, certain high performance bicycles have included disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

In the case of a mechanically actuated disc brake device, each movable brake pad is typically attached to a piston that is movable in response to operation of a camming mechanism. Upon the operation of the camming mechanism to move the piston or pistons, the brake pads come into contact with the rotor for applying frictional resistance and causing the bicycle to slow down or stop. One example of a mechanically actuated disc brake device is disclosed in U.S. Pat. No. 6,557,671 (assigned to Shimano Inc.).

In the case of a hydraulically actuated disc brake device, the movable brake pad is typically attached to a piston that is movable in response to fluid pressure applied via a hydraulic fluid conduit in the caliper housing. Upon the application of fluid pressure to the piston or pistons, the brake pads come into contact with the rotor for applying frictional resistance and causing the bicycle to slow down or stop. Examples of a hydraulically actuated disc brake devices are disclosed in U.S. Patent Application Publication No. 2011/0000748A1 (assigned to Shimano Inc.) and U.S. Patent Application Publication No. 2011/0000749A1 (assigned to Shimano Inc.)

SUMMARY

While disc brake systems provide excellent performance, such hydraulic disc brake systems can be relatively heavy. Thus, one aspect present in this disclosure is to provide a bicycle disc brake caliper that is lightweight.

In view of the state of the known technology, a bicycle disc brake caliper is basically provided that comprises a first side caliper part, a second side caliper part, a layer of bonding material, a mating recess, and a mating protrusion. The first side caliper part includes a first bonding surface. The second side caliper part includes a second bonding surface. The layer of bonding material is disposed between the first and second bonding surfaces of the first and second side caliper parts. The mating recess is disposed on one of the first and second side caliper parts. The mating protrusion is disposed on the other of the first and second side caliper parts, and is mated with the mating recess. The first and second bonding surfaces of the first and second side caliper parts are fixedly bonded together by the layer of bonding material with a brake disc slot being defined between the first and second side caliper parts.

These and other objects, features, aspects and advantages of the disclosed bicycle disc brake caliper will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
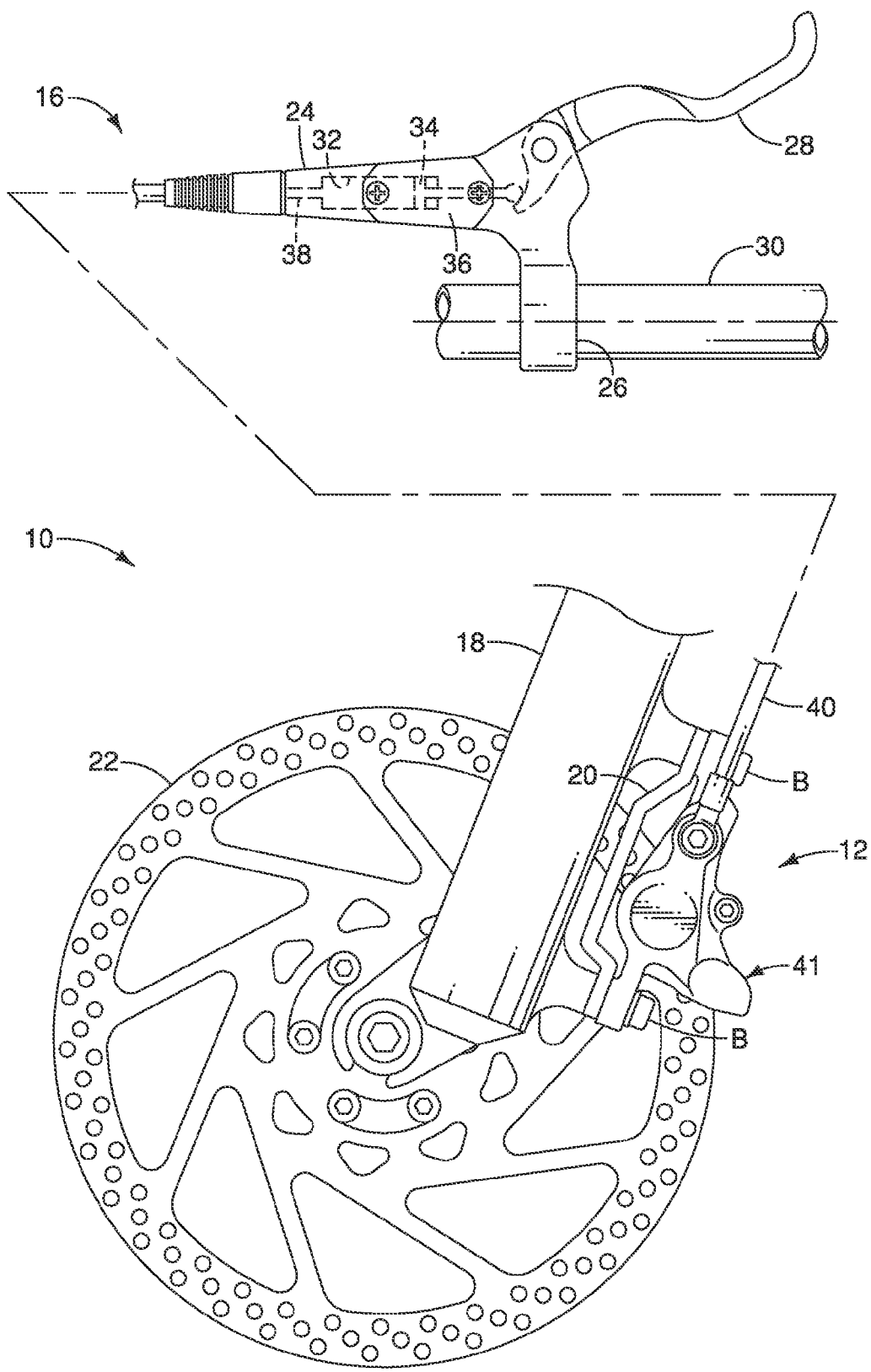
FIG. 1 is a partial side elevational view of a front disc brake system including a front disc brake device (e.g., a bicycle disc brake caliper) coupled to a front fork and a front disc brake controller coupled to a handlebar) that operates the front disc brake device in accordance with a first embodiment.

Referring initially to FIG. 1, a front disc brake system 10 is illustrated that includes a bicycle disc brake caliper 12 and a brake operating (actuating) mechanism 16 in accordance with a first embodiment. The disc brake caliper 12 is mounted to a front fork 18 of a bicycle (not shown) by a bracket 20 using a pair of bolts B. The disc brake caliper 12 is constructed for selectively gripping (stopping rotation) of a disc brake rotor 22 that is fixedly attached to a hub (not shown) of a bicycle wheel (not shown).

As seen in FIG. 1, basically, the brake operating mechanism 16 is designed to actuate the disc brake caliper 12 in a conventional manner to apply a forcible gripping action on the disc brake rotor 22 to stop rotation of the bicycle wheel. The brake operating mechanism 16 basically has a master cylinder 24, a clamp 26 and a brake lever 28. The brake lever 28 is pivotally coupled to the master cylinder 24 for operating the disc brake caliper 12. The brake operating mechanism 16 is supported on a handlebar 30 via the clamp 26 in a conventional manner. The master cylinder 24 also has a hydraulic fluid reservoir 36 that is in fluid communication with the master cylinder bore 32. The hydraulic fluid reservoir 36 contains hydraulic fluid (mineral oil) which is pressurized by movement of the piston 34 in the master cylinder 24 in response to the pivotal movement of the brake lever 28 towards the handlebar 30. The master cylinder 24 has an outlet port 38 for supplying hydraulic fluid to the disc brake caliper 12 via a hydraulic brake hose 40. Since the operation of the brake operating mechanism 16 is conventional, the parts (e.g., the master cylinder 24, the and the piston 34) of the brake operating mechanism 16 will not be discussed or shown in further detail herein.

Figure 2:
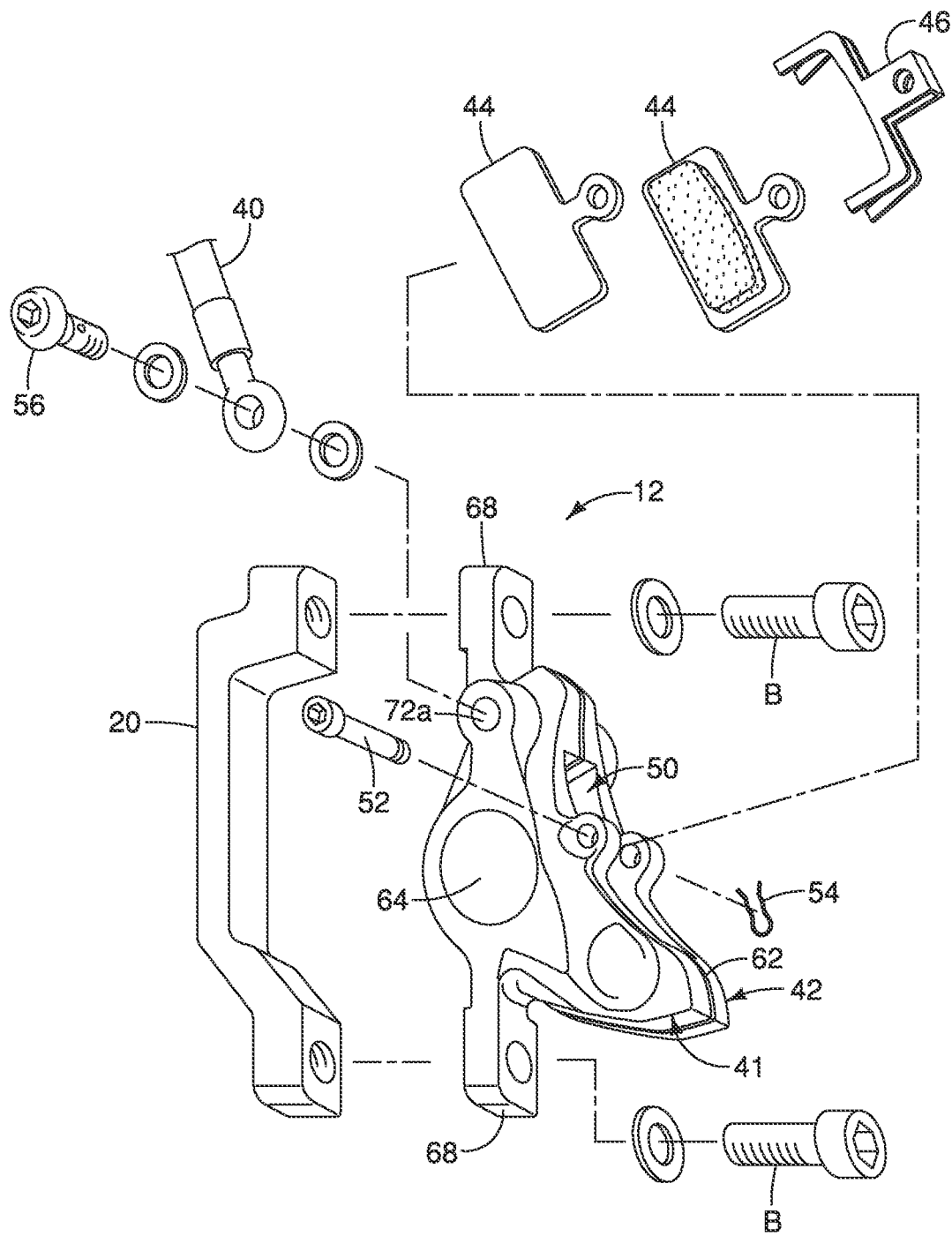
FIG. 2 is an exploded perspective view of the disc brake device illustrated in FIG. 1.
Figure 3:
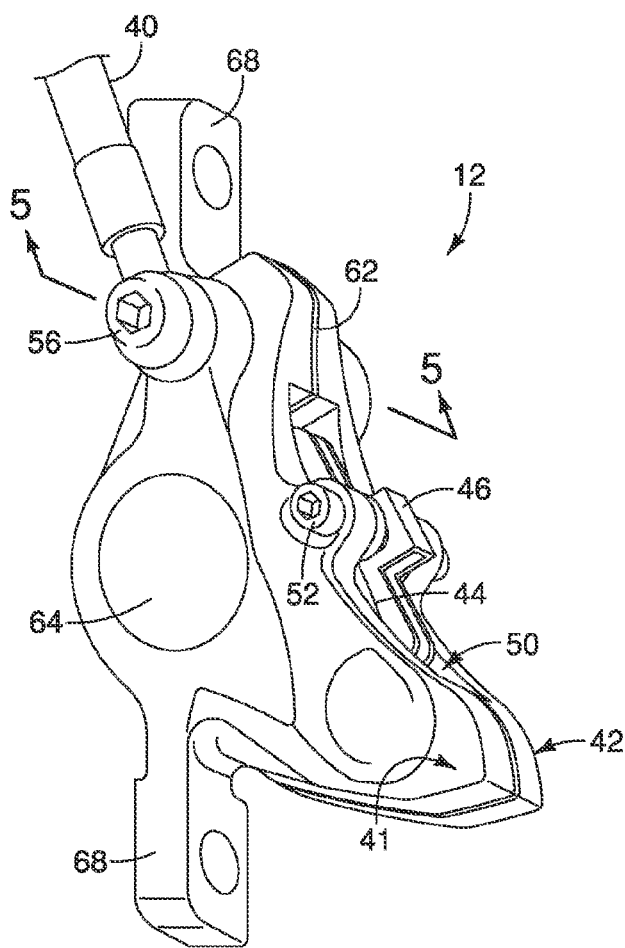
FIG. 3 is an enlarged perspective view of the disc brake device illustrated in FIGS. 1 and 2.
Figure 4:
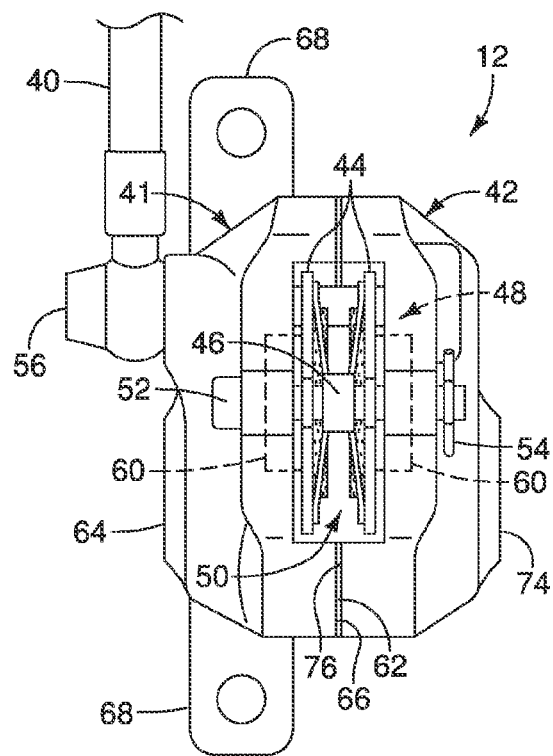
FIG. 4 is a rear end view of the disc brake device illustrated in FIGS. 1 to 3.

As seen in FIGS. 2 to 4, the disc brake caliper 12 includes a first (left) side caliper part 41, a second (right) side caliper part 42, a pair of brake pads or friction members 44, a biasing member 46 and an actuation unit 48 (FIG. 4). The first and second side caliper parts 41 and 42 are fixedly connected together solely by bonding to form a caliper housing with a brake disc slot 50 being defined between the first and second side caliper parts 41 and 42. A pad axle or pin 52 is provided for mounting the brake pads 44 and the biasing member 46 in the brake disc slot 50. The pad axle or pin 52 is retained to the first and second side caliper parts 41 and 42 with a spring clip 54 in a conventional manner. Thus, the brake pads 44 are movable mounted to the first and second side caliper parts 41 and 42 by the pad axle 52 and the spring clip 54 in a conventional manner. The biasing member 46 is a metal member that is disposed between the brake pads 44 to bias the brake pads 44 out of engagement with the disc brake rotor 22 in a conventional manner.

The disc brake caliper 12 is a relatively conventional disc brake device, except for the connection between the first and second side caliper parts 41 and 42. Thus, other than the connection between the first and second side caliper parts 41 and 42 described below, the disc brake caliper 12 is a relatively conventional fluid operated disc brake caliper. Therefore, specific and/or common features of the disc brake caliper 12 will not be discussed or illustrated in detail herein except to the extent that they relate to the connection between the first and second side caliper parts 41 and 42 as discussed below.

In the first illustrated embodiment, the hydraulic brake hose 40 is fluidly connecting to the first and second side caliper parts 41 and 42 using a banjo bolt or fitting 56. In this first embodiment, the banjo bolt 56 is short type and has inner hydraulic though hole for hydraulic communication with the hydraulic brake hose 40. Thus, hydraulic fluid from the hydraulic brake hose 40 is feed to the first and second side caliper parts 41 and 42 via the banjo bolt 56 for operating the actuation unit 48 in a conventional manner. The actuation unit 48 is a conventional structure that basically includes a pair of movable pistons 60. The pistons 60 are hydraulically actuated to move relative to the first and second side caliper parts 41 and 42 (i.e., the caliper housing) from a retracted (non-gripping) position to a gripping position in response to the fluid pressure from operation of the brake operating mechanism 16 in a conventional manner.

The first and second side caliper parts 41 and 42 are preferably each a rigid metallic material such as cast aluminum or other suitable heat resistant material that can withstand the heat generated during braking. In the first illustrated embodiment, the first and second side caliper parts 41 and 42 are separate pieces that are manufactured using conventional manufacturing techniques such as casting and/or machining. The first side caliper part 41 is a one-piece, unitary member. Likewise, the second side caliper part 42 is a one-piece, unitary member.

In this first embodiment, as the first and second side caliper parts 41 and 42 are fixedly connected together without using a bolt, rivet or the like. In other words a mechanical fastener such as a bolt, rivet or the like is not used in this first embodiment. Rather, the first and second side caliper parts 41 and 42 are fixedly connected together solely by one or more bonding materials. The term "bonding material" as used herein refers to a material that joins or affixes two or more objects together by adhering together two abutting surfaces. The term "bonding material" as used herein includes, but not limited to, adhesives, filler metals (e.g., soldering materials, brazing materials, welding materials, etc.) and melted base materials of the parts being joined. The term. "bonding material" as used herein excludes hardware devices (e.g., bolts, screws, rivets, etc.) that mechanically joins or affixes two or more objects together. The term "bonding" as used herein refers to joining or affixing two or more objects together by adhering together two abutting surfaces with a bonding material. Thus, with the first and second side caliper parts 41 and 42 being fixedly connected together solely by one or more bonding materials, the disc brake caliper 12 is lighter in weight than a conventional disc brake caliper having the same sized parts but connected with one or more hardware devices (e.g., mechanical fasteners such as bolts).

Figure 5:
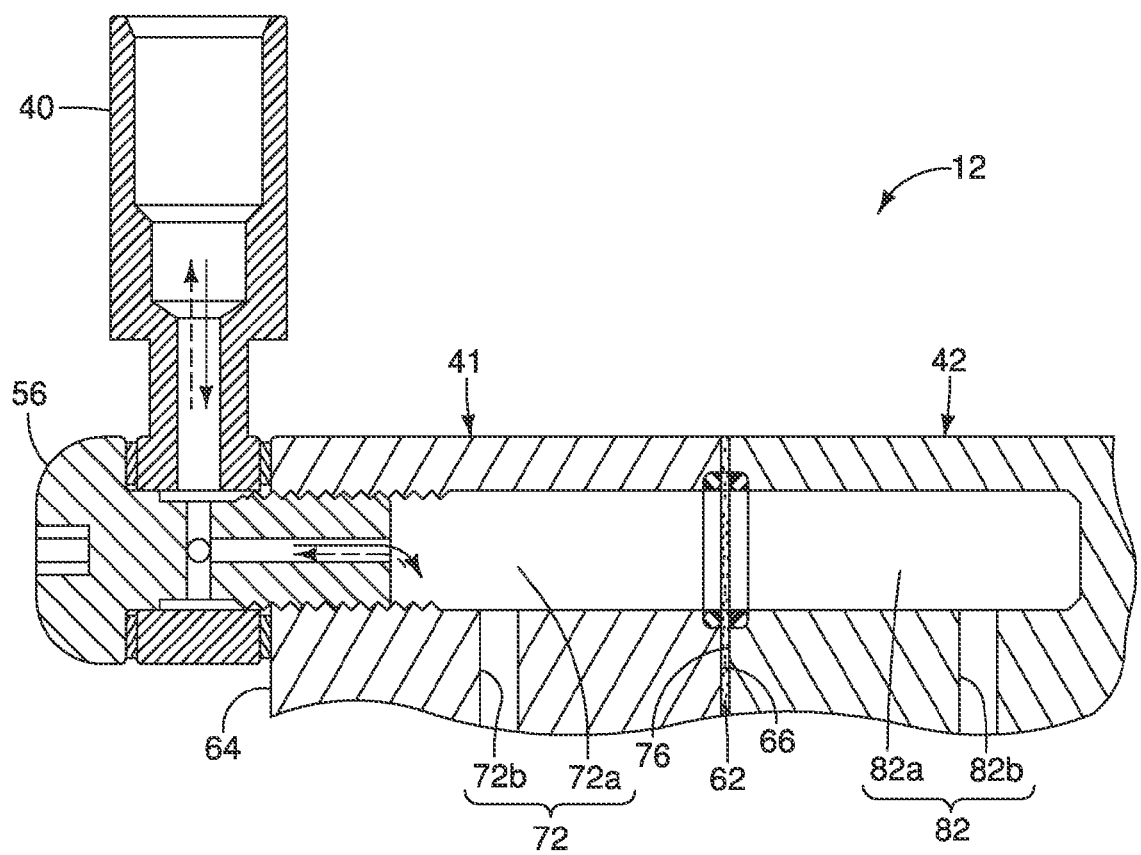
FIG. 5 is a cross sectional view of the disc brake device illustrated in FIGS. 1 to 4 as seen along section line 5-5 of FIG. 3.
Figure 6:
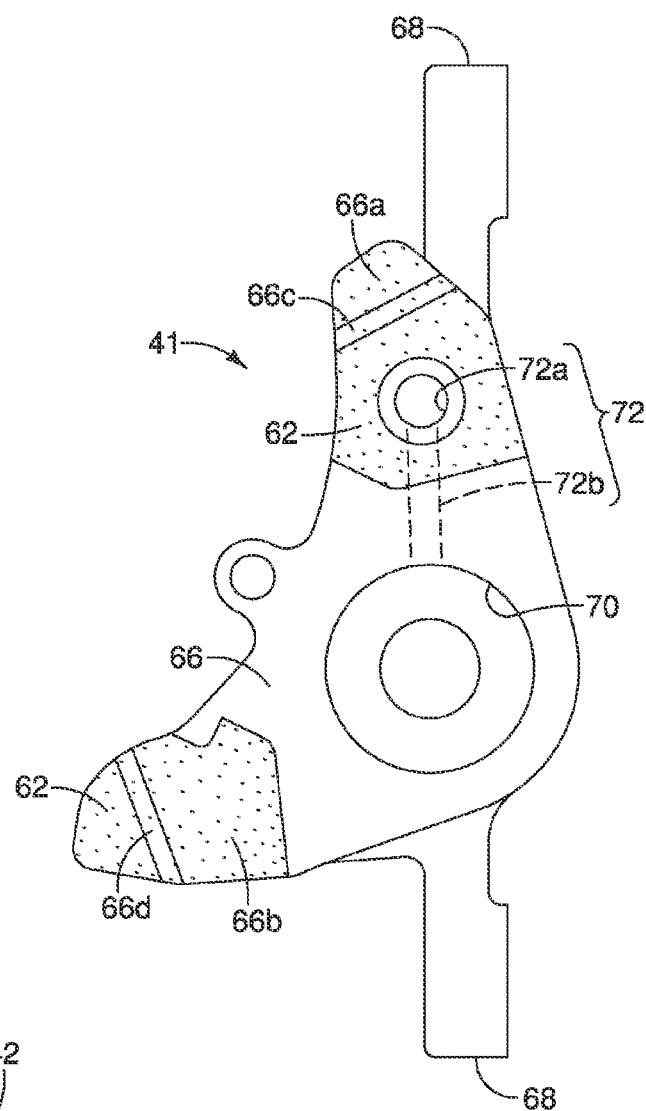
FIG. 6 is an elevational view of the inside surface of the first side caliper part of the disc brake device illustrated in FIGS. 1 to 5.
Figure 7:
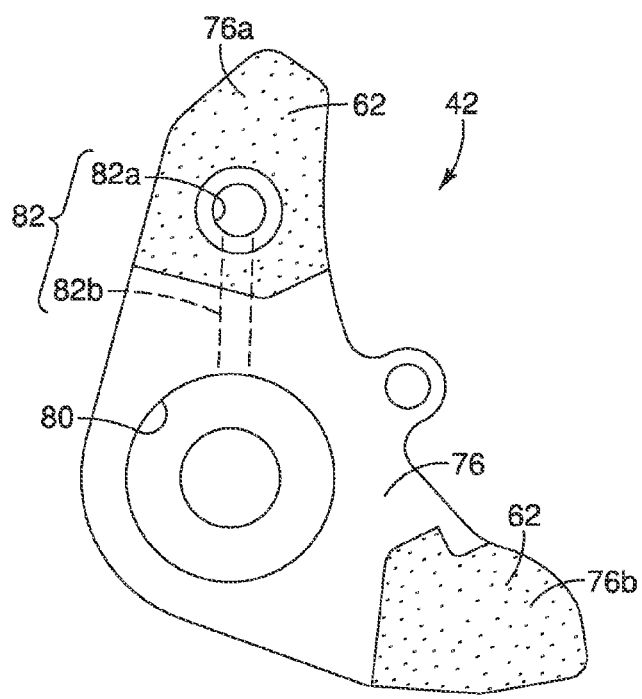
FIG. 7 is an elevational view of the inside surface of the second side caliper part of the disc brake device illustrated in FIGS. 1 to 5.

In this first embodiment, as seen in FIGS. 4 to 6, the first and second side caliper parts 41 and 42 are solely bonded together by a bonding material 62 such an adhesive, a filler metal (e.g., a soldering material, a brazing material, a welding material, etc.) and/or material from the first and second side caliper parts 41 and 42 that is melted. As explained below, the bicycle disc brake caliper 12 is constructed in such a manner as to be lighter in weight than a conventional disc brake caliper having a comparable size. The thickness of the bonding material 62 has been exaggerated in the figures for the sake of illustration.

The first side caliper part 41 has an exteriorly facing surface 64 and an interiorly facing surface 66. The exteriorly facing surface 64 is provided with a pair of mounting flanges 68 (e.g., bicycle mounting parts) for securing the bicycle disc brake caliper 12 to the front fork 18 by the bolts B. The interiorly facing surface 66 forms a first bonding surface that includes two bonding areas 66a and 66b that are spaced apart. Alternatively, the interiorly facing surface 66 can be configured with a large continuous bonding area or three or more separate bonding areas as needed and/or desired. Optionally, as shown, the bonding areas 66a and 66b can be provided with recesses 66c and 66d, respectively, for receiving any excess of the bonding material 62. In other words, the recesses 66c and 66d aid in preventing the bonding material 62 from flowing out from the circumference of the bonding areas 66a and 66b. While only one recess is shown in each of the bonding areas 66a and 66b, any number of recesses can be used as needed and/or desired. Also the recesses 66c and 66d are shown as being straight grooves for the sake of simplicity of illustration. Of course, it will be apparent from this disclosure that the shape of the recesses can be any shape as needed and/or desired.

The first side caliper part 41 is also provided with a first piston receiving cavity 70 and a first internal fluid passageway 72. The first piston receiving cavity 70 is configured to slidably receiving one of the pistons 60 of the actuation unit 48. The first internal fluid passageway 72 includes a first fluid opening or fluid inlet 72a that is threaded to receive the banjo bolt 56 for fluidly connecting the hydraulic brake hose 40 to the first internal fluid passageway 72. The banjo bolt 56 is threadedly engaged with the threaded portion of the first fluid inlet 72a, and has an interior channel in fluid communication with the first fluid inlet 72a. The first internal fluid passageway 72 further includes a first fluid conduit 72b that interconnects the first fluid inlet 72a to the first piston receiving cavity 70.

The second side caliper part 42 has an exteriorly facing surface 74 and an interiorly facing surface 76. The interiorly facing surface 76 forms a first bonding surface that includes two bonding areas 76a and 76b that are spaced apart. Alternatively, the interiorly facing surface 76 can be configured with a large continuous bonding area or three or more separate bonding areas as needed and/or desired. Also the bonding areas 76a and 76b can be optionally provided with recesses for receiving any excess of the bonding material 62, if needed and/or desired. In any event, the bonding areas 76a and 76b of the second side caliper part 42 mate with the bonding areas 66a and 66b of the first side caliper part 41.

The second side caliper part 42 is also provided with a second piston receiving cavity 80 and a second internal fluid passageway 82. The second piston receiving cavity 80 is configured to slidably receiving one of the pistons 60 of the actuation unit 48. The second internal fluid passageway 82 includes a second fluid opening or fluid inlet 82a that is aligned with the first fluid inlet 72a of the first side caliper part 41 for receiving hydraulic fluid from the first internal fluid passageway 72. In particular, the banjo bolt 56 has an interior channel that is in fluid communication with the second fluid inlet 82a. The second internal fluid passageway 82 further includes a second fluid conduit 82b that interconnects the second fluid inlet 82a to the second piston receiving cavity 80.

The internal fluid passageways 72 and 82 receive the hydraulic fluid from the brake operating mechanism 20 via the hydraulic brake hose 40 and the banjo bolt 56, and then the internal fluid passageways 72 and 82 supply the fluid to the piston receiving cavities 70 and 80. In this way, the hydraulic fluid enters the and second side caliper parts 41 and 42 through the fluid inlets 72a and 82a. Then hydraulic fluid flows into the piston receiving cavities 70 and 80 via the fluid conduits 72b and 82b to apply fluid pressure to the back sides of the pistons 60 on either side of the rotor 22.

Figure 8:
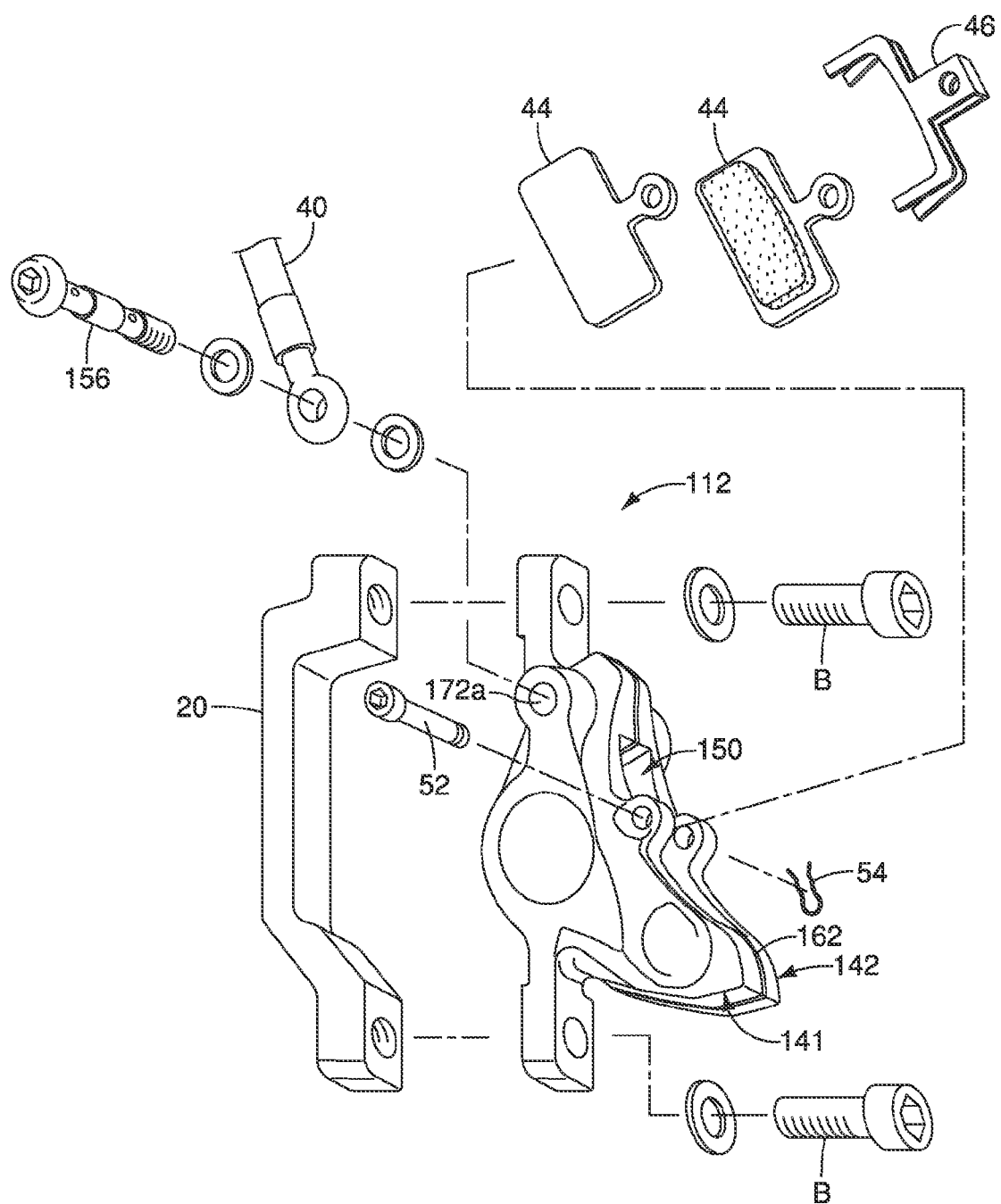
FIG. 8 is an exploded perspective view of a disc brake device in accordance with a second embodiment.
Figure 9:
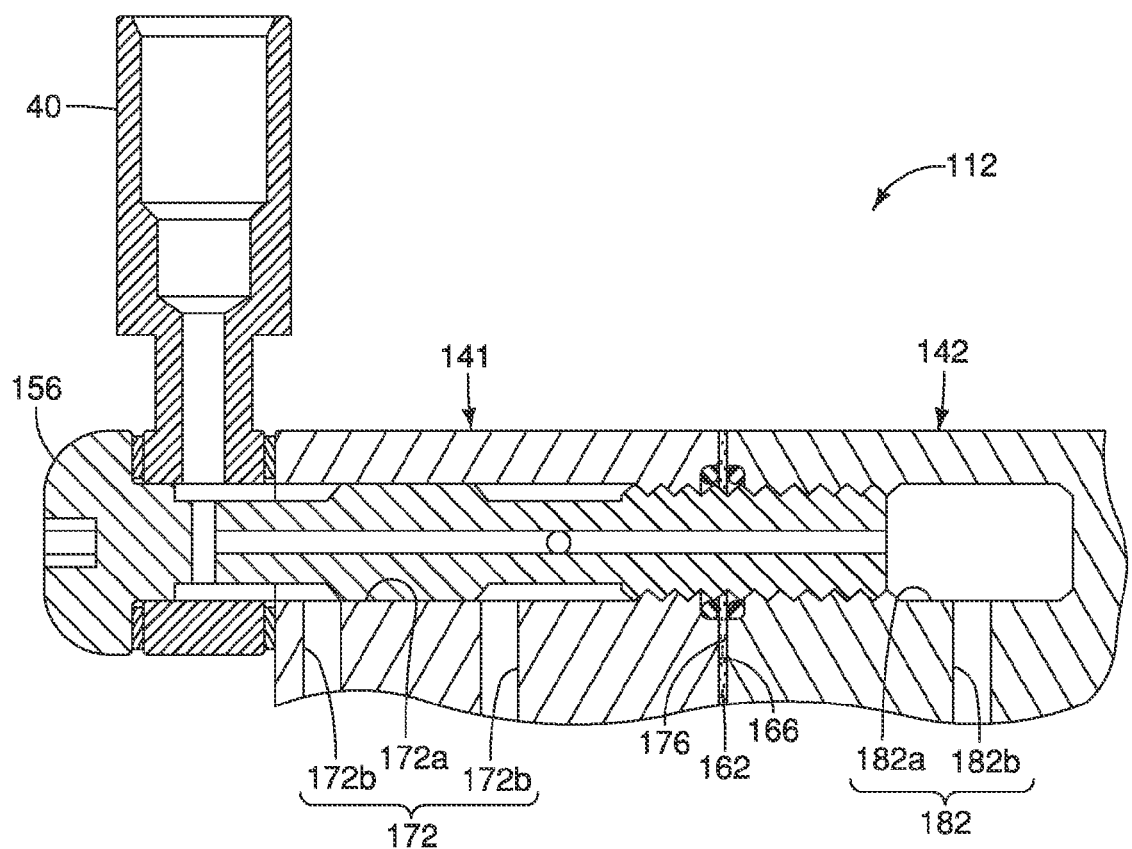
FIG. 9 is a cross sectional view of the disc brake device illustrated in FIG. 8 as seen along section line that is similar to FIG. 5.
Figure 10:
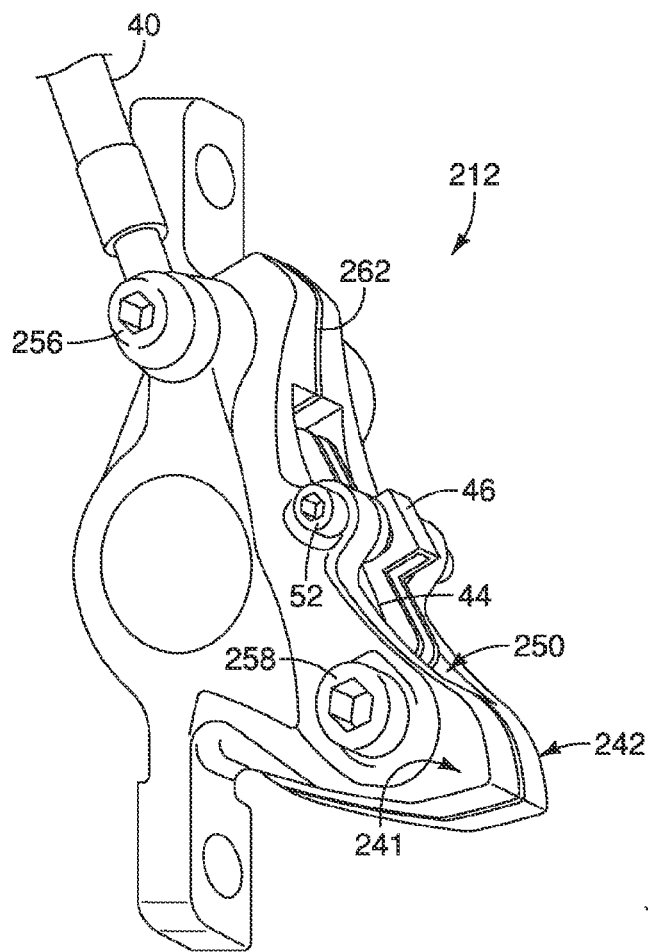
FIG. 10 is a perspective view of a front disc brake device (e.g., a bicycle disc brake caliper) in accordance with a third embodiment.
Figure 11:
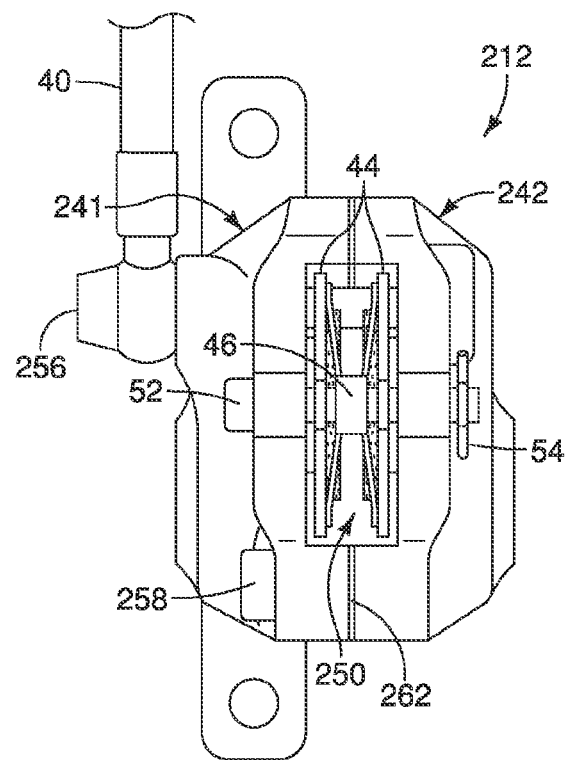
FIG. 11 is a rear end view of the front disc brake device illustrated in FIG. 10.
Figure 12:
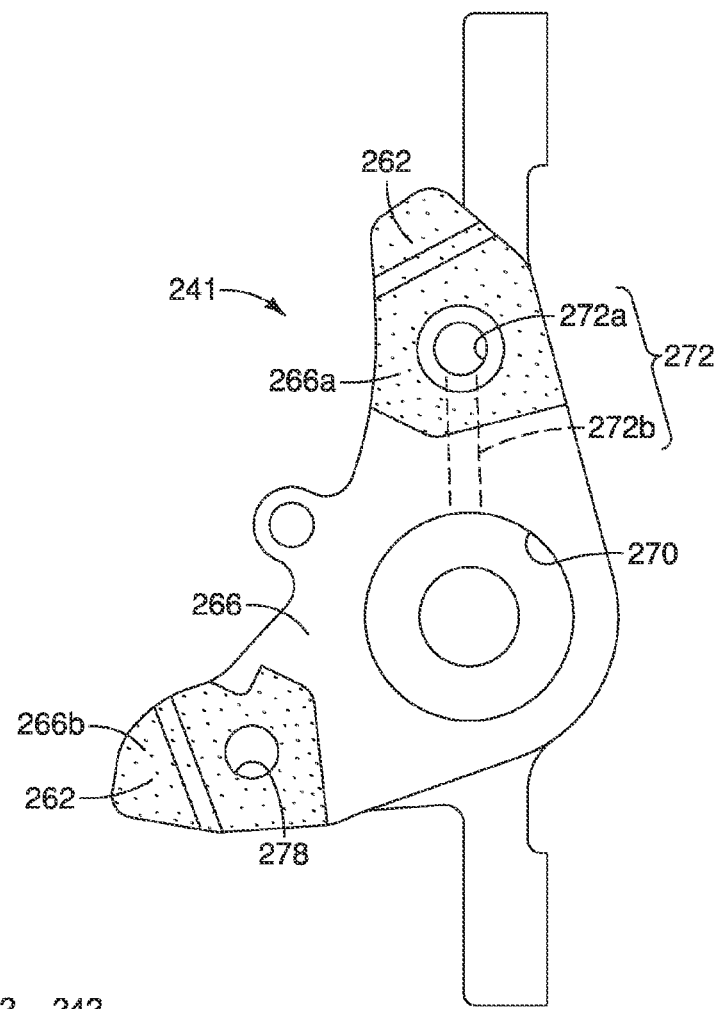
FIG. 12 is an elevational view of the inside surface of the first side caliper part of the front disc brake device illustrated in FIGS. 10 and 11.
Figure 13:
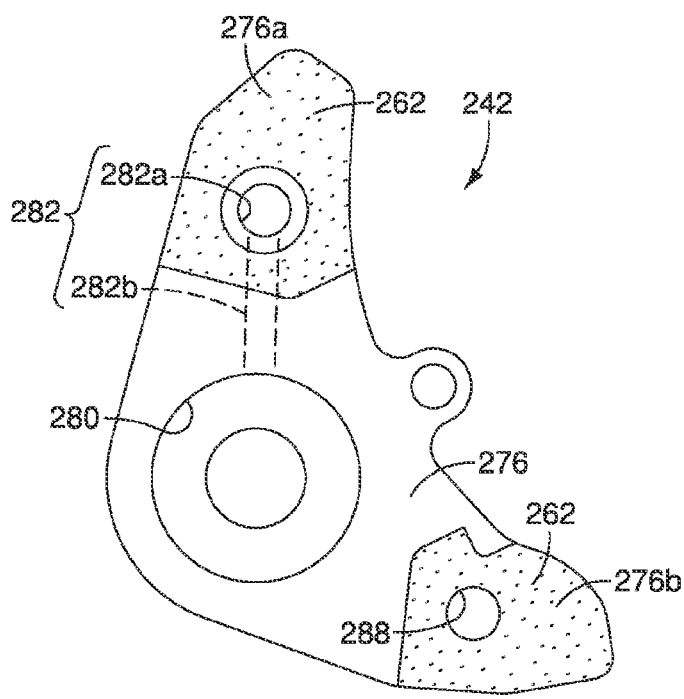
FIG. 13 is an elevational view of the inside surface of the second side caliper part of the front disc brake device illustrated in FIGS. 10 to 12.
Figure 14:
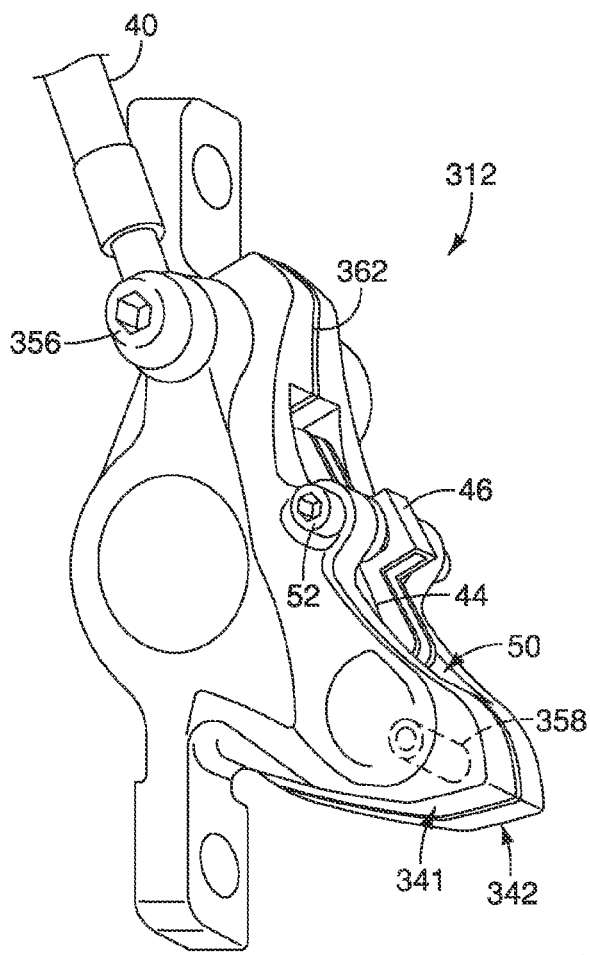
FIG. 14 is a perspective view of a front disc brake device (e.g., a bicycle disc brake caliper) in accordance with a fourth embodiment.
Figure 15:
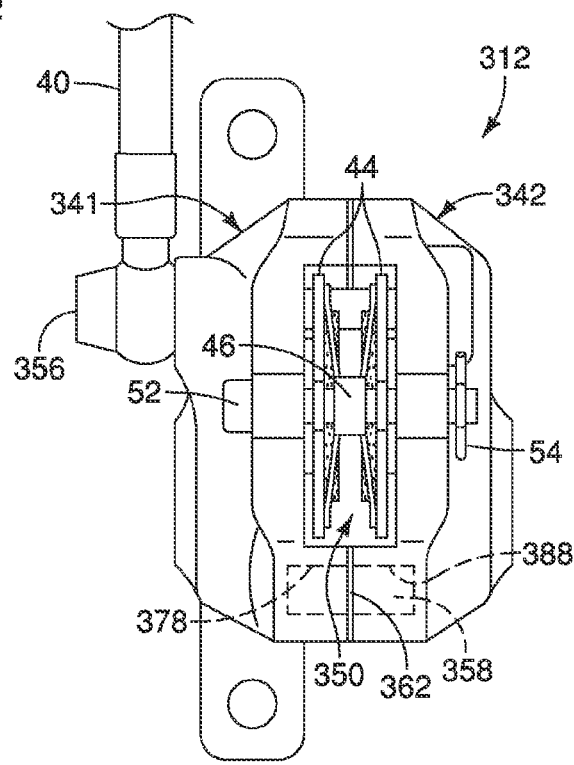
FIG. 15 is a rear end view of the front disc brake device illustrated in FIG. 14.
Figure 16:
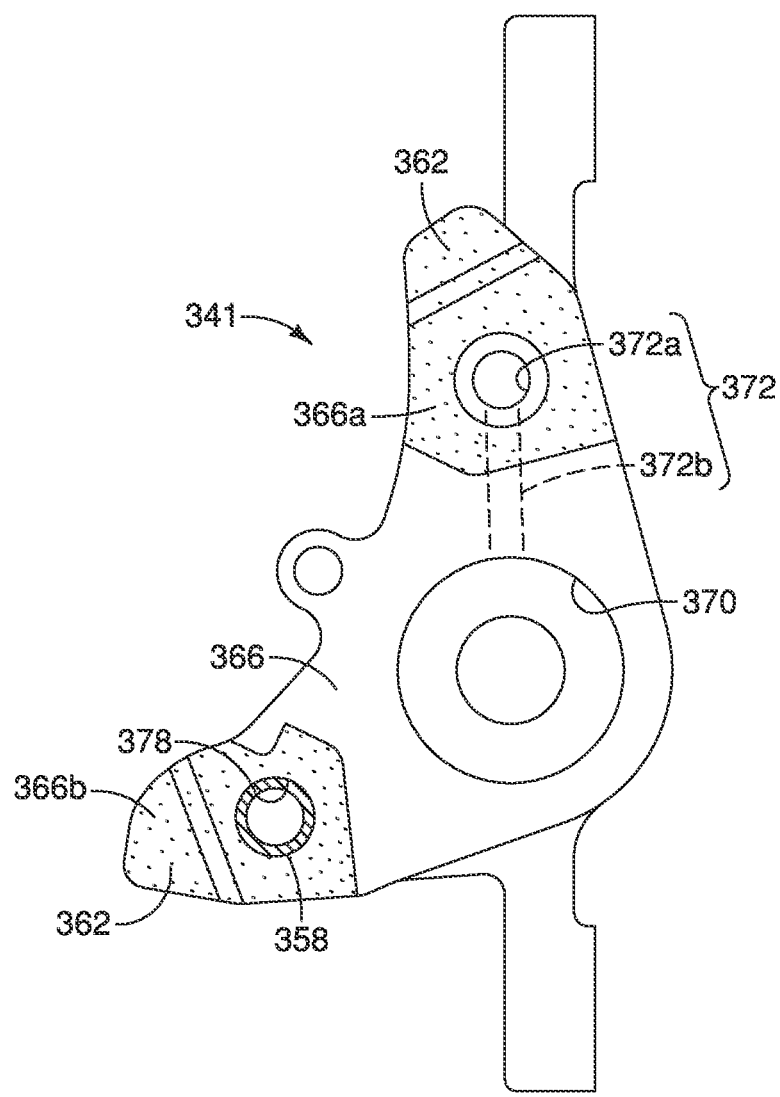
FIG. 16 is an elevational view of the inside surface of the first side caliper part of the front disc brake device illustrated in FIGS. 14 and 15.
Figure 17:
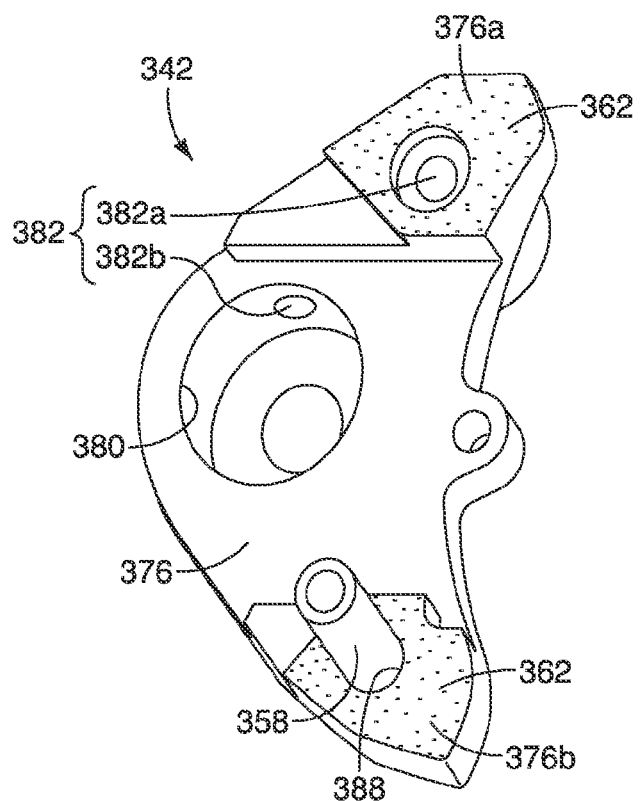
FIG. 17 is a perspective view of the second side caliper part of the disc brake device illustrated in FIGS. 14 to 16.
Figure 18:
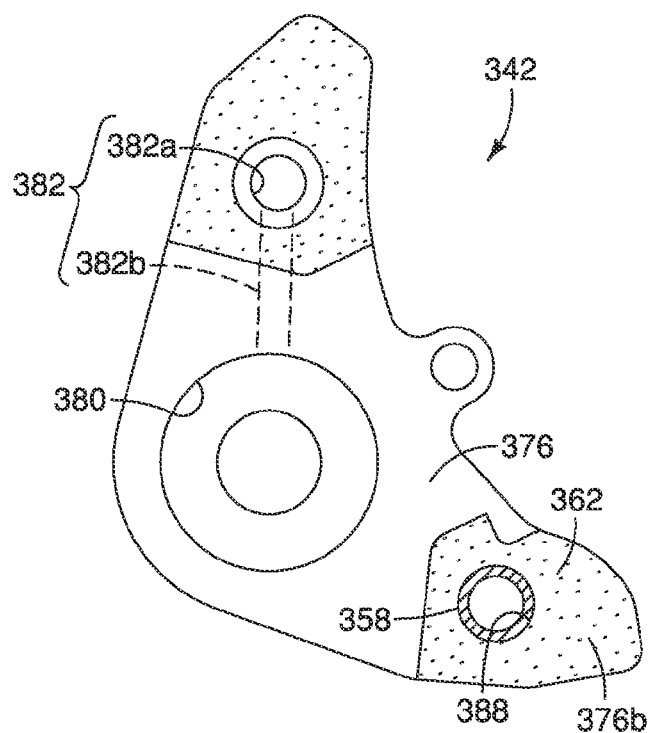
FIG. 18 is an elevational view of the inside surface of the second side caliper part of the disc brake device illustrated in FIGS. 14 to 17.

Referring now to FIGS. 8 and 9, a bicycle disc brake caliper 112 in accordance with a second embodiment will now be explained. Here, in the second embodiment, the bicycle disc brake caliper 112 includes a first (left) side caliper part 141 and a second (right) side caliper part 142 in which a long banjo bolt or fitting 156 is used as a connection between the first and second side caliper parts 141 and 142. The first and second side caliper parts 141 and 142 are identical to the first and second side caliper parts 41 and 42, as discussed above, except that the first and second side caliper parts 141 and 142 have been modified to accommodate the long banjo bolt 156. In view of the similarity between the first and second embodiments, the descriptions of the parts of the second embodiment that are the same as the first embodiment may be omitted for the sake of brevity. Moreover, the parts of the second embodiment that are common with the first embodiment are identified with the same reference numeral. Thus, only the differences between the first and second embodiments will be discussed.

Here, similar to the first embodiment, the first side caliper part 141 has an interiorly facing surface 166 that is provided with a first piston receiving cavity (not shown) for receiving one of the pistons 60 of the first embodiment. However, in the second embodiment, the first side caliper part 141 has a first internal fluid passageway 172 that includes a non-threaded first fluid opening or fluid inlet 172a and a pair of first fluid conduit 172b that interconnects the first fluid inlet 172a to the first piston receiving cavity (not shown). Thus, the first side caliper part 141 has been modified to accommodate the long banjo bolt 156.

Similar to the first embodiment, the second side caliper part 142 has an interiorly facing surface 176 that is provided with a second piston receiving cavity (not shown) for receiving one of the pistons 60 of the first embodiment. However, in the second embodiment, the second side caliper part 142 has a first internal fluid passageway 182 that includes a threaded second fluid opening or fluid inlet 182a and a second fluid conduit 182b that interconnects the second fluid inlet 182a to the second piston receiving cavity (not shown). Thus, the second side caliper part 142 has been modified to accommodate the long banjo bolt 156.

Similar to the first embodiment, the first and second interiorly facing surfaces 166 and 176 of the first and second side caliper parts 141 and 142 are bonded together by a bonding material 162. The bonding material 162 can be an adhesive, a filler metal (e.g., a soldering material, a brazing material, a welding material, etc.) and/or material from the first and second side caliper parts 141 and 142 that is melted. Similar to the first embodiment, the first and second interiorly facing surfaces 166 and 176 have two separate bonding areas having the bonding material 162.

Referring now to FIGS. 10 to 13, a bicycle disc brake caliper 212 in accordance with a third embodiment will now be explained. Here, in the third embodiment, the bicycle disc brake caliper 212 includes a first (left) side caliper part 241 and a second (right) side caliper part 242 in which a banjo bolt or fitting 256 is used to supply hydraulic fluid to the first and second side caliper parts 241 and 242. The banjo bolt 256 can be either a short banjo bolt (e.g., the banjo bolt 56) or a long banjo bolt (e.g., the banjo bolt 156). In other words, depending on whether a long or short type of banjo bolt is used, the first and second side caliper parts 241 and 242 can be configured similar to either the first and second side caliper parts 41 and 42, or the first and second side caliper parts 141 and 142. The only difference between the first and second side caliper parts 241 and 242 of this third embodiment and the prior embodiments is that the first and second side caliper parts 241 and 242 have been modified to accommodate a slim bolt connection using a slim bolt 258 (i.e., a connection bolt) that is threadedly engaged with a threaded hole or bore in one of the first and second side caliper parts 241 and 242 as discussed below. Thus, the bicycle disc brake caliper 212 uses bonding plus a slim bolt connection to hold the first and second side caliper parts 241 and 242 together in this third embodiment.

In view of the similarity between the third embodiment and the prior embodiments, the descriptions of the parts of the third embodiment that are the same as the prior embodiments may be omitted for the sake of brevity. Moreover, the parts of the third embodiment that are common with the first embodiment are identified with the same reference numeral. Thus, only the differences between the third embodiment and the prior embodiments will be discussed.

Here, similar to the first and second embodiments, the first side caliper part 241 has an interiorly facing surface 266 that is provided with a first piston receiving cavity 270 for receiving one of the pistons 60 of the first embodiment. Also similar to the first and second embodiments, the first side caliper part 241 has a first internal fluid passageway 272 that includes a first fluid opening or fluid inlet 272a and at least one first fluid conduit 272b that interconnects the first fluid inlet 272a to the first piston receiving cavity 270. The first fluid inlet 272a is either threaded for receiving a short banjo bolt, like the first embodiment, or non-threaded for receiving a long banjo bolt, like the second embodiment. However, in the third embodiment, the first side caliper part 241 has a non-threaded hole 278 for receiving the slim bolt 258. Thus, the first side caliper part 241 has been modified to accommodate the slim bolt 258.

Similar to the first embodiment, the second side caliper part 242 has an interiorly facing surface 276 that is provided with a second piston receiving cavity 280 for receiving one of the pistons 60 of the first embodiment. Also similar to the first and second embodiments, the second side caliper part 242 has a first internal fluid passageway 282 that includes a second fluid opening or fluid inlet 282a and a second fluid conduit 282b that interconnects the second fluid inlet 282a to the second piston receiving cavity 280. However, in the third embodiment, the second side caliper part 242 has a threaded hole 288 for receiving the slim bolt 258. Thus, the second side caliper part 242 has been modified to accommodate the slim bolt 258. The slim bolt 258 has an outer thread diameter of four millimeters as compared to a conventional caliper that uses bolts with an outer thread diameter of six millimeters. Thus, a reduction in weight can be obtained in the bicycle disc brake caliper 212 as compared to a conventional caliper that uses bolts with an outer thread diameter of six millimeters.

Similar to the prior embodiments, the first and second interiorly facing surfaces 266 and 276 of the first and second side caliper parts 241 and 242 are bonded together by a bonding material 262. The bonding material 262 can be an adhesive, a filler metal (e.g., a soldering material, a brazing material, a welding material, etc.) and/or material from the first and second side caliper parts 241 and 242 that is melted. Similar to the prior embodiments, the first interiorly facing surface 266 has two separate bonding areas 266a and 266b having the bonding material 262, while the second interiorly facing surface 276 has two separate bonding areas 276a and 276b having the bonding material 262.

Referring now to FIGS. 14 to 18, a bicycle disc brake caliper 312 in accordance with a fourth embodiment will now be explained. The fourth embodiment is most similar to the third embodiment, except that the slim bolt 258 is not used in this fourth embodiment. Here, in the fourth embodiment, the bicycle disc brake caliper 312 includes a first (left) side caliper part 341 and a second (right) side caliper part 342 in which a banjo bolt or fitting 356 is used to supply hydraulic fluid to the first and second side caliper parts 341 and 342. The banjo bolt 356 can be either a short banjo bolt (e.g., the banjo bolt 56) or a long banjo bolt (e.g., the banjo bolt 156). In other words, depending on whether a long or short type of banjo bolt is used, the first and second side caliper parts 341 and 342 can be configured similar to either the first and second side caliper parts 41 and 42, or the first and second side caliper parts 141 and 142. The only difference between the first and second side caliper parts 341 and 342 of this fourth embodiment and the third embodiment is that the first and second side caliper parts 341 and 342 have been modified to accommodate a pin connection using a hollow pin 358 (i.e., a connection pin) as discussed below. Thus, the bicycle disc brake caliper 312 uses bonding plus a pin connection to hold the first and second side caliper parts 341 and 342 together in this fourth embodiment.

In view of the similarity between the third and fourth embodiments, the descriptions of the parts of the fourth embodiment that are the same as the prior embodiments may be omitted for the sake of brevity. Moreover, the parts of the fourth embodiment that are common with the first embodiment are identified with the same reference numeral. Thus, only the differences between the fourth embodiment and the prior embodiments will be discussed.

Here, similar to the prior embodiments, the first side caliper part 341 has an interiorly facing surface 366 that is provided with a first piston receiving cavity 370 for receiving one of the pistons 60 of the first embodiment. Also similar to the prior embodiments, the first side caliper part 341 has a first internal fluid passageway 372 that includes a first fluid opening or fluid inlet 372a and at least one first fluid conduit 372b that interconnects the first fluid inlet 372a to the first piston receiving cavity 370. The first fluid inlet 372a is either threaded for receiving a short banjo bolt, like the first embodiment, or non-threaded for receiving a long banjo bolt, like the second embodiment. However, in the fourth embodiment, the first side caliper part 341 has a first hole 378 (mating recess) for receiving a first portion (mating protrusion) of the connection pin 358. Thus, the first side caliper part 341 has been modified to accommodate the connection pin 358.

Similar to the prior embodiments, the second side caliper part 342 has an interiorly facing surface 376 that is provided with a second piston receiving cavity 380 for receiving one of the pistons 60 of the first embodiment. Also similar to the prior embodiments, the second side caliper part 342 has a first internal fluid passageway 382 that includes a second fluid opening or fluid inlet 382a and a second fluid conduit 382b that interconnects the second fluid inlet 382a to the second piston receiving cavity 380. However, in the fourth embodiment, the second side caliper part 342 has a second hole 388 (mating recess) for receiving a second portion (mating protrusion) of the connection pin 358. Thus, the second side caliper part 342 has been modified to accommodate the connection pin 358.

Similar to the prior embodiments, the first and second interiorly facing surfaces 366 and 376 of the first and second side caliper parts 341 and 342 are bonded together by a bonding material 362. The bonding material 362 can be an adhesive, a filler metal (e.g., a soldering material, a brazing material, a welding material, etc.) and/or material from the first and second side caliper parts 341 and 342 that is melted. Similar to the prior embodiments, the first interiorly facing surface 366 has two separate bonding areas 366a and 366b having the bonding material 362, while the second interiorly facing surface 376 has two separate bonding areas 376a and 376b having the bonding material 362.

Preferably, the connection pin 358 is press fitted and/or adhesively secured in the first and second holes 378 and 388 of the first and second side caliper parts 341 and 342. Also, one of the first and second holes 378 and 388 of the first and second side caliper parts 341 and 342 can be threaded, while the other one of the first and second holes 378 and 388 of the first and second side caliper parts 341 and 342 can be a non threaded hole in which the connection pin 358 is press fitted and/or adhesively secured. In this way, the connection pin 358 positions the first and second side caliper parts 341 and 342 relative to each other and aids in preventing separation of the first and second side caliper parts 341 and 342. One of the first and second side caliper parts 341 and 342 can be considered to include a first mating portion, and one of the first and second side caliper parts 341 and 342 can be considered to include a second mating portion that mates with the first mating portion. Also, while only one connection pin is used, additional connection pins can be used as needed and/or desired.

Figure 19:
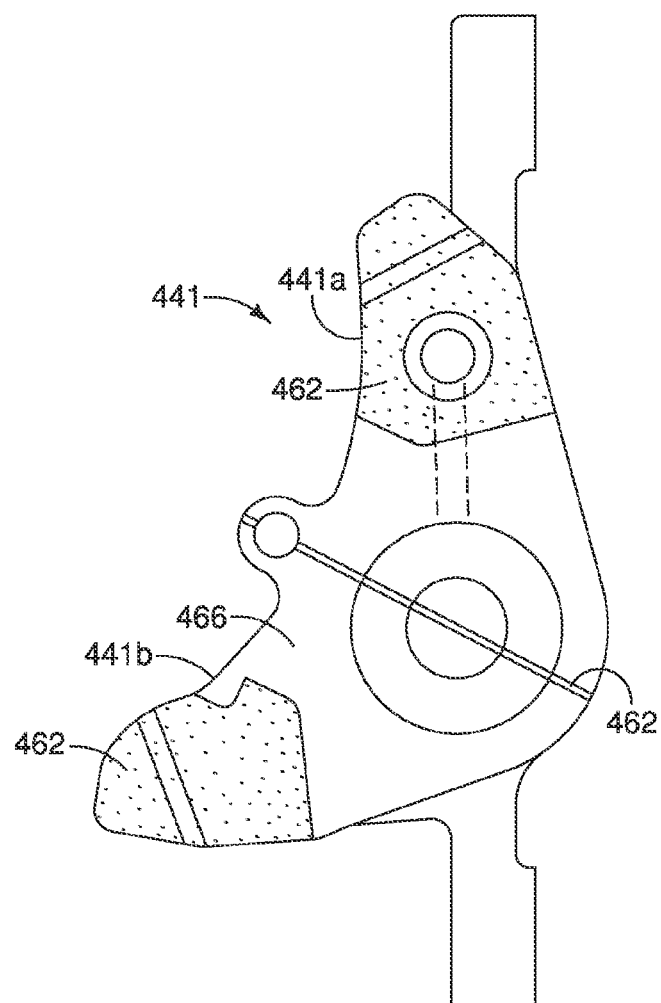
FIG. 19 is an elevational view of an inside surface of a first side caliper part for a disc brake device in accordance with a fifth embodiment.
Figure 20:
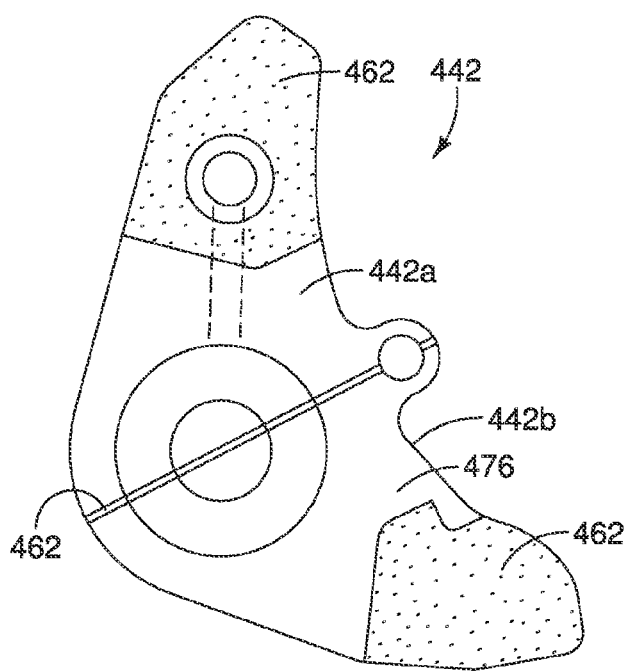
FIG. 20 is an elevational view of an inside surface of a second side caliper part that is used with the first side caliper part illustrated in FIG. 19 in accordance with the fifth embodiment.

Referring now to FIGS. 19 and 20, first and second side caliper parts 441 and 442 are illustrated for forming a bicycle disc brake caliper in accordance with a fifth embodiment. In other words, the first and second side caliper parts 441 and 442 replace the first and second side caliper parts of the first or second embodiments to form a bicycle disc brake caliper that is connected to the hydraulic brake hose 40 using either the banjo bolt 56 or 156. Basically, the first and second side caliper parts 441 and 442 are identical to the first and second side caliper parts 41 or 141 and 42 or 142, respectively, except that the first and second side caliper parts 441 and 442 are each made of two pieces instead of each being formed as a one-piece member. In particular, the first side caliper part 441 includes two portions 441a and 441b that are bonded together, while the second side caliper part 442 includes two portions 442a and 442b that are bonded together. In view of the similarity between the fifth embodiment and the prior embodiments, the descriptions of the parts of the fifth embodiment that are the same as the prior embodiments may be omitted for the sake of brevity. Thus, only the differences between the fifth embodiment and the prior embodiments will be discussed.

Here, in the fifth embodiment, similar to the prior embodiments, the first and second side caliper parts 441 and 442 are bonded together by a bonding material 462 at two spaced apart areas. However, the bonding material 462 is also used for bonding the two portions 441a and 441b together as well as being used for bonding the two portions 442a and 442b together. Of course, the bonding material 462 does not need to be the same bonding material for each of the bonds. For example, interiorly facing surfaces 466 and 467 of the first and second side caliper parts 441 and 442 can be adhesively bonded together, while the two portions 441a and 441b can be bonded together by a brazing material and the two portions 442a and 442b can also be bonded together by a brazing material or other bonding material.

Figure 21:
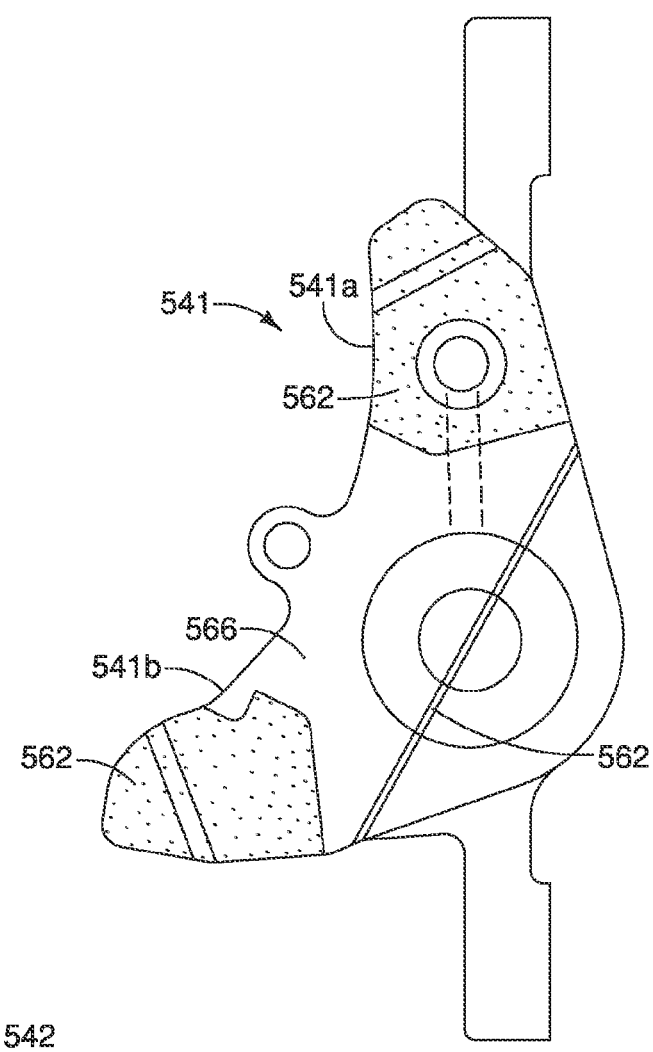
FIG. 21 is an elevational view an inside surface of a first side caliper part for a disc brake device in accordance with a sixth embodiment.
Figure 22:
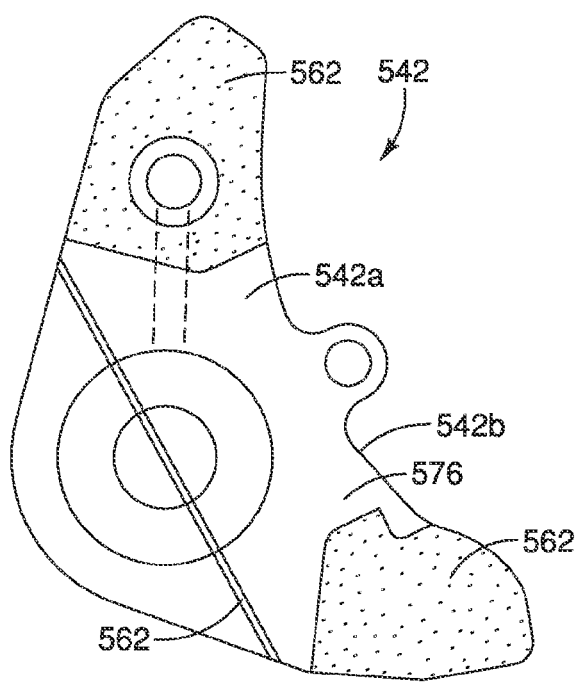
FIG. 22 is an elevational view of an inside surface of a second side caliper part that is used with the first side caliper part illustrated in FIG. 21 in accordance with the sixth embodiment.

Referring now to FIGS. 21 and 22, first and second side caliper parts 541 and 542 are illustrated for forming a bicycle disc brake caliper in accordance with a sixth embodiment. In other words, the first and second side caliper parts 541 and 542 replace the first and second side caliper parts of the first or second embodiments to form a bicycle disc brake caliper that is connected to the hydraulic brake hose 40 using either the banjo bolt 56 or 156. Basically, the first and second side caliper parts 541 and 542 are identical to the first and second side caliper parts 41 or 141 and 42 or 142, respectively, except that the first and second side caliper parts 541 and 542 are each made of two pieces instead of each being formed as a one-piece member. In particular, the first side caliper part 541 includes two portions 541a and 541b that are bonded together, while the second side caliper part 542 includes two portions 542a and 542b that are bonded together. In view of the similarity between the sixth embodiment and the prior embodiments, the descriptions of the parts of the sixth embodiment that are the same as the prior embodiments may be omitted for the sake of brevity. Thus, only the differences between the sixth embodiment and the prior embodiments will be discussed.

Here, in the sixth embodiment, similar to the prior embodiments, the first and second side caliper parts 541 and 542 are bonded together by a bonding material 562 at two spaced apart areas. However, the bonding material 562 is also used for bonding the two portions 541a and 541b together as well as being used for bonding the two portions 542a and 542b together. Of course, the bonding material 562 does not need to be the same bonding material for each of the bonds. For example, interiorly facing surfaces 566 and 567 of the first and second side caliper parts 541 and 542 can be adhesively bonded together, while the two portions 541a and 541b can be bonded together by a brazing material and the two portions 542a and 542b can also be bonded together by a brazing material or other bonding material.

Of course, it will be apparent to those skilled in the art from this disclosure that the disc brake calipers 12, 112, 212 and 312 can be used in a rear disc brake system as needed and/or desired. Also, while the disc brake caliper 12 is illustrated as a hydraulically actuated disc brake device, housings of the disc brake calipers 12, 112, 212 and 312 can be modified to be used with a mechanically actuated disc brake device as needed and/or desired.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake caliper comprising:
a first side caliper part including a first bonding surface;
a second side caliper part including a second bonding surface;
a layer of bonding material disposed between the first and second bonding surfaces of the first and second side caliper parts;
a first hole disposed in the first side caliper part;
a second hole disposed in the second side caliper part, the first and second holes not passing completely through a corresponding one of the first and second side caliper parts;
a hollow connecting pin disposed in the first hole and the second hole;
a piston receiving cavity for receiving a piston; and
a fluid inlet for supplying hydraulic fluid to the piston receiving cavity, the fluid inlet being disposed on an opposite side of bicycle disc brake caliper as the hollow connecting pin such that the piston receiving cavity is disposed between the fluid inlet and the hollow connecting pin,
the first and second bonding surfaces of the first and second side caliper parts being fixedly bonded together by the layer of bonding material with a brake disc slot being defined between the first and second side caliper parts.

2. The bicycle disc brake caliper according to claim 1, wherein
at least one of the first and second side caliper parts includes a bicycle mounting part.

3. The bicycle disc brake caliper according to claim 1, wherein
at least one of the first and second bonding surfaces has a recess with the bonding material disposed in the recess.

4. The bicycle disc brake caliper according to claim 1, wherein
each of the first and second bonding surfaces includes at least two separate bonding areas that are spaced apart.

5. The bicycle disc brake caliper according to claim 1, wherein
the connection pin is adhesively secured in one of the first and second holes.

6. The bicycle disc brake caliper according to claim 1, wherein
the connection pin is threadedly secured in one of the first and second holes.

7. The bicycle disc brake caliper according to claim 6, wherein
the connection pin is adhesively secured in the other of the first and second holes.

8. The bicycle disc brake caliper according to claim 1, wherein
the connection pin is press fitted in one of the first and second holes.

9. The bicycle disc brake caliper according to claim 1, wherein
the first and second bonding surfaces of the first and second side caliper parts surround the connection pin.

10. The bicycle disc brake caliper according to claim 1, wherein
the first and second bonding surfaces of the first and second side caliper parts surround a corresponding one of the first and second holes.

11. The bicycle disc brake caliper according to claim 1, further comprising
a banjo bolt threadedly engaged with a threaded hole in one of the first and second side caliper parts,
the first side caliper part having a first fluid passageway and the second side caliper part having a second fluid passageway, the first and second fluid passageways being in communication with each other,
the banjo bolt having an interior channel in fluid communication with the first fluid passageway or the second fluid passageway of the one of the first and second side caliper parts.

12. The bicycle disc brake caliper according to claim 1, wherein
the first and second side caliper parts and the layer of bonding material are arranged with respect to each other such that an outer periphery of the disc brake caliper and the bonding material form a continuous even surface at a seam formed by the layer of the bonding material between the first and second side caliper parts.

* * * * *